United States Patent
Roba et al.

(10) Patent No.: US 6,550,282 B2
(45) Date of Patent: Apr. 22, 2003

(54) METHOD AND APPARATUS FOR MANUFACTURING AN OPTICAL FIBER FROM A PREFORM

(75) Inventors: Giacomo Stefano Roba, Monza (IT); Roberto Pata, Bergamo (IT)

(73) Assignee: Pirelli Cavi e Sistemi S.P.A., Milan (IT)

(*) Notice: Subject to any disclaimer, the term of this patent is extended or adjusted under 35 U.S.C. 154(b) by 42 days.

(21) Appl. No.: 09/741,882

(22) Filed: Dec. 22, 2000

(65) Prior Publication Data

US 2001/0020374 A1 Sep. 13, 2001

Related U.S. Application Data

(63) Continuation of application No. PCT/EP99/04292, filed on Jun. 22, 1999.
(60) Provisional application No. 60/091,046, filed on Jun. 29, 1998.

(51) Int. Cl.$^7$ .............................................. C03B 37/022
(52) U.S. Cl. .............................. 65/402; 65/430; 65/431; 65/432; 65/443; 65/504
(58) Field of Search .......................... 65/402, 443, 430, 65/431, 432, 504

(56) References Cited

U.S. PATENT DOCUMENTS

| | | | |
|---|---|---|---|
| 4,427,717 A | * | 1/1984 | Gauthier ...................... 65/402 |
| 4,504,000 A | | 3/1985 | Doyel |
| 5,298,047 A | | 3/1994 | Hart, Jr. et al. |
| 5,418,881 A | | 5/1995 | Hart, Jr. et al. |
| 5,928,574 A | * | 7/1999 | DiMarcello et al. .......... 65/434 |
| 6,324,872 B1 | * | 12/2001 | Blaszyk et al. ............... 65/402 |
| 6,327,876 B1 | * | 12/2001 | Cocchini et al. .............. 65/430 |

FOREIGN PATENT DOCUMENTS

| | | |
|---|---|---|
| DE | 30 10 005 | 2/1981 |
| EP | 0 078 733 | 5/1983 |
| EP | 0 582 405 | 2/1994 |
| EP | 0 729 919 | 9/1996 |
| EP | 0 744 636 | 11/1996 |
| EP | 0 795 521 | 9/1997 |
| WO | WO 97 07067 | 2/1997 |
| WO | WO 97 22897 | 6/1997 |
| WO | WO 97 26221 | 7/1997 |

OTHER PUBLICATIONS

Kazuo; "Production of Bundle–Type Optical Fiber", Patent Abstracts of Japan of JP, 06–239642 dated Aug. 30, 1994.

Miya et al.; "A Process for the Manufacture of Optical Fibres for Maintaining Single Mode Circular Polarization", Patent Abstracts of Japan and Partial Translation of JP 58–020746, Feb. 7, 1983.

* cited by examiner

*Primary Examiner*—James Derrington

(57) ABSTRACT

A method for manufacturing an optical fiber (100) having low PMD, comprises the steps of:

a) heating at least one end portion (3a) of a preform (3);

b) drawing an optical fiber (100) from a free end of said heated end portion (3a) along a fiber drawing axis (I—I);

c) coating said optical fiber (100) with a suitable coating material;

d) applying to said coated optical fiber (100) a torque about said fiber drawing axis (I—I), e) winding said coated optical fiber (100) onto a collecting spool (9). According to the invention, step d) is carried out by means of a pulley (16) supported upstream of said collecting spool (9) and rotated about the fiber drawing axis (I—I), said optical fiber (100) being wound up onto said pulley (16) for an angle of at least about 360°. Advantageously, such method also allows to notably increase the amount of optical fiber produced per unit of time with respect to the prior art.

4 Claims, 3 Drawing Sheets

METHOD AND APPARATUS FOR MANUFACTURING AN OPTICAL FIBER FROM A PREFORM

This application is a continuation of International Application No. PCT/EP99/04292, filed Jun. 22, 1999, and claims the priority of European Patent Application No. 98202098.4, filed Jun. 24, 1998, and the benefit of U.S. Provisional Application Ser. No. 60/091,046, filed Jun. 29, 1998, the content of which is incorporated herein by reference.

FIELD OF THE INVENTION

The present invention relates, in a first aspect thereof, to a method for manufacturing an optical fiber from a preform, comprising the steps of:

a) heating at least one end portion of said preform;

b) drawing an optical fiber from a free end of said heated end portion along a fiber drawing axis;

c) coating said optical fiber with a suitable coating material;

d) applying to said coated optical fiber a torque about said fiber drawing axis, e) winding said coated optical fiber onto a collecting spool.

More specifically, this invention relates to a method for manufacturing an optical fiber having low PMD for use in telecommunication field.

The present invention also relates to a device for applying a torque to an optical fiber about its drawing axis, as well as to an apparatus for carrying out the above-mentioned method.

PRIOR ART

As is known, in signal transmission systems using optical fibers, above all in those systems operating over long distances, the need arises of minimizing any kind of attenuation or dispersion of the signals, in order to assure high transmission and reception standards. In particular, the need arises of minimizing a specific dispersion phenomenon known as PMD (Polarization Mode Dispersion), that implies a restriction in the width of the signal transmission band and, accordingly, a worsening in the performances of the optical fibers through which the above-mentioned signals are transmitted.

As is known, the fundamental propagation mode of a signal in an optical fiber may be seen as the resultant of two linearly polarized waves on orthogonal planes. Theoretically, in a perfectly symmetric circular section fiber (i.e., in monomode fibers) the propagation constants of the two components are identical and therefore the mode is propagates unaltered and according to a cylindrical symmetry along the fiber itself, with the two components traveling at the same speed. In contrast thereto, however, optical fibers possess in practice structural and geometrical irregularities that, by altering the above-mentioned cylindrical symmetry, bring about asymmetric stress conditions in the fibers themselves and anisotropy in their optical properties; accordingly, the two mode components meet zones with different refraction index and travel with different propagation speeds, thus causing the PMD phenomenon.

A parameter of particular importance in this respect, is the so-called coherence length or fiber beat length, that is, the necessary length of fiber needed for the two components of the fundamental mode to get in phase again with one another.

Other than by structural and/or geometrical defects which are intrinsic in the fiber, such as, for example, the presence of not perfectly circular cores, the PMD phenomenon may also be originated by asymmetric stress conditions caused by outer stresses such as, for example, those generated in operation during the spool winding or wiring steps.

It has been experimentally shown that it is possible to reduce the PMD of an optical fiber by submitting the latter to suitable external stresses during the drawing process, in particular by applying a torque to such an optical fiber.

To this end, various devices and methods for manufacturing an optical fiber having low PMD have been proposed in the past, the earlier ones based upon the technique of rotating the preform (a technique which was soon abandoned due to the evident technological difficulties and to the impossibility of obtaining high rotational speed), the most recent ones based upon the technique of applying during the drawing process a torque to the fiber about its axis (fiber spinning/twisting).

Therefore, for example, U.S. Pat. No. 4,504,000 (Thomson—CSF) discloses a method for manufacturing an optical fiber having a chiralic structure with high circular birefringence, wherein an equipment provided with three pulleys applies to a fiber produced from a heated portion of a preform a torque about the axis thereof. The applied torque is subsequently "frozen" in the fiber structure by means of a suitable coating film, in glass or glass-ceramic, applied on the fiber itself in a dedicated coating station.

A drawback associated to the above disclosed method is connected to the high risk of damaging the fiber surface due to the fact that the latter gets in touch with the above mentioned pulleys before being properly protected by a suitable coating film.

In order to overcome the above mentioned drawback it has been proposed, as disclosed in U.S. Pat. Nos. 5,298,047 and 5,418,881 (AT&T), to arrange the device adapted to apply the torque to the fiber downstream of the coating station. In particular, in the above mentioned patents, torque is applied by means of a fiber guiding roll having a rotation axis which extends perpendicularly to the drawing axis of the fiber and which is alternatively canting in clockwise and counterclockwise direction.

Although substantially achieving the object of reducing the PMD of the fiber, the Applicant has however noticed that the above disclosed method shows a series of drawbacks to which no adequate solution has been given up to now.

A first drawback observed by the Applicant is connected to the need of limiting the canting frequency of the guiding roll in order to avoid that, during the drawing process, a relative sliding between the optical fiber and the roll could take place. Actually, there are two reasons for such a sliding to be particularly disadvantageous: firstly because it could cause a mechanical abrasion of the optical fiber surface and, accordingly, a worsening of the mechanical resistance properties and of the performances of the fiber itself; secondly, because it does not allow the torque to be imparted to the optical fiber according to a desired law of variation, thus limiting the advantageous effects given by the applied twisting regarding the reduction of the PMD phenomenon.

The limitation of the canting frequency of the guiding roll implies, furthermore, a corresponding limitation in the drawing speed of the fiber (the two speeds being unavoidably related to one another in order to apply the desired torque to the fiber) and, therefore, a limitation in the amount of fiber produced per unit of time.

A further drawback associated with the above disclosed method is connected to the fact that the oscillations of the fiber during the drawing may induce displacements of the drawing axis which cause undesired fluctuations in the diameter of the fiber produced or unevenness and/or imperfect coaxiality between the fiber and the coating layer applied thereon.

Furthermore, such method does not allow to apply a continuous unidirectional rotation to the optical fiber, because the device which is used necessarily imparts an alternate twisting to the optical fiber.

Other methods are known for the manufacture of optical fibers, comprising the step of applying a torque to the fiber about its drawing axis and "freezing" the applied torque by means of a suitable coating film before the fiber reaches the twisting means are also disclosed by Japanese Patent Application No. JP 58-020746 and by German patent DE 3010005.

JP 58-020746 discloses a method for the manufacture of optical fibers adapted to maintain a single mode circular polarization of the fiber, that is a method wherein the plane of polarization is uniformly rotated across the length of the fiber itself. In order to produce the birefringence required for the circularly polarized mode, the fiber is drawn from the free end of the preform by drawing means located upstream of the coating station and the twist is imparted to the fiber by means of a collecting spool located downstream of a coating station.

Similarly, German Patent DE 3010005 discloses a method for the manufacture of twisted optical fibers wherein the fiber is drawn and twisted by means of a collecting spool located downstream of a number of coating stations.

According to the above disclosed methods, the twist is however imparted to the solidified fiber in the region between said drawing means and said collecting spool, being thus prevented from reaching the softened bottom end of the preform.

A further drawback associated to the above disclosed method is connected to the high mass and inertia of the collecting spool used for imparting the torque to the fiber, which does not allow to increase the rotation speed of the spool (and hence the drawing speed of the fiber), as well as to reliably apply a desired law of torque variation to the fiber. Besides, there is the need of translating the spool (or providing suitable means) for allowing the fiber be collected thereon.

Finally, Japanese Patent Application No. JP 06-239642 discloses a method for the manufacture of optical fiber bundles, wherein a twist is imparted to a number of fibers in order to obtain helically twisted fibers which, once they are collected together to form a bundle, have ends randomly positioned at the incident and emergent sides of the bundle. The twist is imparted, for example, by a caterpillar located upstream of the collecting spool; the caterpillar is also used to draw the fiber from the preform.

The object of the above disclosed method is quite different from the one of the present invention. In fact, for achieving the above mentioned object, fibers having a helical extension along the axial direction are manufactured.

Also in this case and because of the high mass and inertia of the caterpillar used for imparting the torque to the fiber, however, it is not possible to increase the rotation speed of. the caterpillar (and hence the drawing speed of the fiber) as well as to reliably apply to the fiber a desired law of torque variation.

SUMMARY OF THE INVENTION

The applicant has now discovered a method and an apparatus that allow the manufacture of an optical fiber having low PMD, while overcoming at the same time the above mentioned drawbacks of the cited prior art.

According to a first aspect thereof, the present invention relates to a method of the type mentioned hereinabove, which is characterized in that the application to the above mentioned coated fiber of the torque about the drawing axis of the fiber is carried out by means of a pulley which is supported upstream of the collecting spool and rotated about the drawing axis of the fiber and on which said optical fiber is wound up with an angle substantially equal to at least 360°.

Advantageously, the method of the present invention allows to achieve the desired fiber twisting without compromising its properties of mechanical resistance and, in the meantime, allows to obtain a high drawing speed for the same, thus increasing the production of optical fiber per unit of time. Differently from the known methods, in fact, in the method according to the present invention the fiber is wound up for at least about 360° and in substantial absence of sliding onto a member adapted to apply the desired twisting to the fiber itself (pulley); this allows to increase the rotation speed of the pulley itself (and hence the drawing speed of the fiber) without incurring in the risk of having relative sliding between the pulley and the fiber. Further on, the absence of such sliding allows to apply to the fiber the desired law of torque variation.

Advantageously, the absence of any form of oscillation also allows to avoid any interference with the step of applying the coating layer onto the fiber, whereby the layer is thus homogeneously distributed over the entire surface of the fiber.

The above mentioned pulley may be rotated about the drawing axis of the optical fiber according to a unidirectional movement, with a constant or varying rotation speed, such as by way of example a speed varying according to a sinusoidal pattern from a maximum value down to a minimum value, which may eventually be equal to zero.

Alternatively, the above mentioned pulley may be rotated about the drawing axis of the optical fiber according to an alternate movement, in clockwise and counterclockwise direction, respectively. In this instance as well, it may be foreseen a constant rotation speed, by applying such speed first according to a spin direction, then reversing the spin direction and applying the same speed value in the opposite direction. A varying speed pattern will instead consist of a speed variation, for example according to a sinusoidal pattern, from a maximum value in one direction to a maximum value in the opposite direction, passing through a zero speed. value at the point in which the inversion of rotation takes place.

Advantageously, an alternating rotation speed is applied to the pulley. This allows to prevent the presence of residual torsions on the fibers wound onto the collecting spool (i.e. the collected fiber is substantially torsion-free), thus making easier both the unwinding and wiring operations of the same.

In the following description and in the appended claims, the term: "twisting pitch" is used to indicate the linear distance measured along the outer surface of the fiber between two sections thereof to which the same rotation pattern is imparted.

Preferably, the optical fiber is drawn from the preform in a way known per se, though it is in this case possible to apply a drawing speed of the fiber considerably higher than that achievable by the devices of the prior art. This allows to achieve a considerable increase of optical fiber production per time unit. Compatibly with the other components in the drawing system, with the method of the present invention it is in fact possible to apply a drawing speed of, by way of example, 15 m/sec, 20 m/sec, 25 m/sec or even 30 m/s, without any undesired effects on the twisting of the fiber.

In any case, it should be noted that the above mentioned limit value for the drawing speed of the fiber is related to the drawing techniques actually employed, and is not determined by the structural features of the twisting device whereon the pulley is installed.

In a second aspect thereof, the present invention relates to a device for applying to an optical fiber, drawn at a predetermined speed from a heated end of a preform, a torque about a fiber drawing axis thereof.

Advantageously, the device of the present invention is particularly simple from a constructional point of view and has a low cost.

Preferably, the driving means of the device of the present invention is adapted to rotate the pulley about the fiber drawing axis both in a unique direction, and in clockwise and counterclockwise direction, alternately.

Preferably, the above mentioned driving means of the pulley comprises a motor-driven fork-shaped supporting member, having a rotation axis coincident with the fiber drawing axis and whereon the pulley is pivoted in an offset position, in such a way as to be substantially tangent to said axis. The drawing directions of the fiber immediately upstream and downstream of the pulley are therefore identical, thus assuring the absence of misalignment conditions that cause undesired fluctuations in the diameter of the fiber produced and unevenness in the applied coating film.

Advantageously, the driving means of the pulley comprises an electric motor kinematically connected to the pulley, i.e., by means of a belt transmission system.

Advantageously, the reduced weight and the small size of the pulley limit the magnitude of the inertial forces acting on the device during twisting; in such a way, it is possible to achieve rotational speeds which are considerably higher than those of the devices of the prior art, although motors are employed which have less power and a lower cost.

The winding process of the fiber onto the pulley substantially made in the absence of sliding therebetween, is facilitated if the pulley is provided with a suitable profile. In a first embodiment, the pulley is provided with a substantially V-shaped groove, adapted to receive the optical fiber, which comprises opposite side walls forming an angle $\phi$ in the range between 65° and 75° with the plane of symmetry $\pi$ of the pulley.

In a particularly advantageous embodiment, the groove comprises opposite side walls having a first radially outer portion forming an angle $\phi_1$ in the range between 65° and 75° with the plane of symmetry $\pi$ of the pulley and a second radially inner portion forming an angle $\phi_2$ in the range between 25° and 35° with said plane of symmetry $\pi$. Preferably, said first and second portions of the side walls are reciprocally connected by means of an intermediate portion having a radius of curvature in the range between 0 and 2 mm. Such a profile advantageously allows to facilitate the winding and unwinding steps of the fiber onto and from the pulley, respectively.

Preferably, the groove comprises a bottom surface which is essentially planar, or anyway having a radius of curvature considerably larger than the radius of the optical fiber, in such a way that the contact between the fiber and the bottom surface and one of the side walls, respectively, is essentially reduced to a point in cross section. If the fiber is wound up onto the pulley for an angle substantially equal to 360°, the bottom surface of the groove will also have a width adapted to allow for the simultaneous housing of two fiber portions lying side-by-side (respectively associated to a new portion of fiber entering into the pulley and to the portion of fiber leaving the pulley).

Preferably, the pulley is made of a suitable material adapted to develop with the optical fiber a coefficient of friction capable to assure a substantial absence of sliding during the winding up of the fiber onto the pulley. Even more preferably, such coefficient of friction is greater than about 0.4. In this way, it is possible to carry out a fiber twisting without compromising its properties of mechanical resistance, even for values of drawing force smaller than those applicable in the devices of the prior art.

In a third aspect thereof, the present invention relates to an apparatus for manufacturing an optical fiber from a preform, comprising:
- means for heating at least one end portion of said preform;
- means for drawing an optical fiber from a free end of said heated end portion along a fiber drawing axis;
- at least one coating station of said optical fiber; characterized in that it comprises, downstream said at least one coating station, a device of the type described hereinabove.

BRIEF DESCRIPTION OF THE DRAWINGS

Further features and advantages of the present invention will become more readily apparent from the following detailed description of a preferred embodiment thereof, given hereinbelow by way of illustrative and non limitative example, reference being made to the accompanying drawings.

In such drawings.

DETAILED DESCRIPTION OF THE PREFERRED EMBODIMENT

Figure 1:
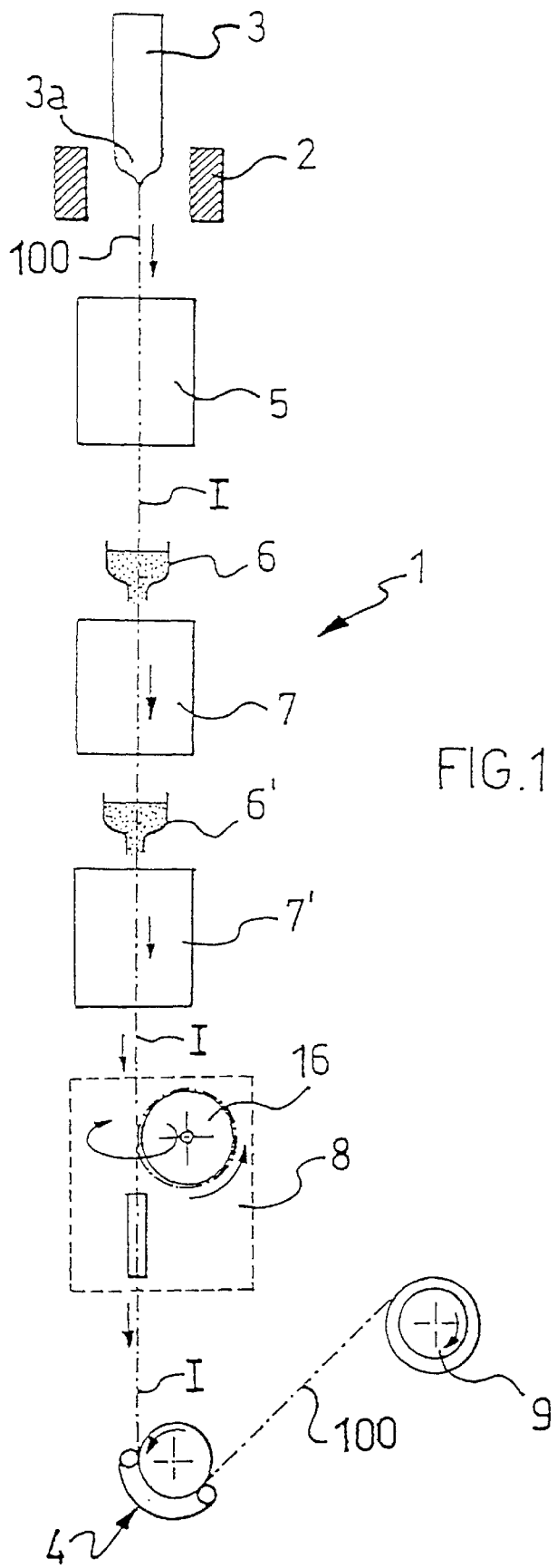
FIG. 1 is a schematic view of an apparatus for manufacturing an optical fiber according to the invention.

In FIG. 1, numeral 1 indicates an apparatus for manufacturing an optical fiber according to the present invention.

The apparatus 1 comprises a furnace 2 known per se, adapted to heat an end portion 3a of a silica-based preform 3, of conventional type as well, having a diameter in the range between about 2 and about 12 cm. Drawing means 4 (of known type as well) are provided downstream of the furnace 2 for drawing at a predetermined speed an optical fiber 100 from the end 3a of the preform 3 along a drawing axis I—I.

The apparatus 1 is provided, between the furnace 2 and the drawing means 4, with a device 5 for cooling the fiber 100, known per se, adapted to adjust the temperature of the fiber 100 at the inlet of a first coating station 6, wherein a first layer of protective film, typically consisting of an acrylic resin, is applied (the presence of the cooling device 5 is particularly advantageous mainly in very high speed drawing processes). A UV-ray furnace 7 for crosslinking the applied resin and another pair of coating station 6'/UV-ray furnace 7', respectively designed to apply and subsequently crosslink a second layer of protective film, this latter typically consisting of an acrylic resin as well, are provided downstream of the first coating station 6. The overall thickness of the coating applied on the fiber 100 by the two coating stations 6, 6' is typically equal to about 62.5 µm.

A twisting device 8 adapted to impart to the coated optical fiber 100 a torque about the drawing axis I—I is provided downstream of the furnace 7'.

The apparatus 1 further comprises a spool 9 for collecting the produced optical fiber 100, located downstream of the drawing means 4. The collecting spool 9 is stationary with respect to the drawing axis I—I of the optical fiber 100 and rotatably driven about its axis by suitable motor means in order to allow the optical fiber 100 to be wound thereon.

Figure 2:
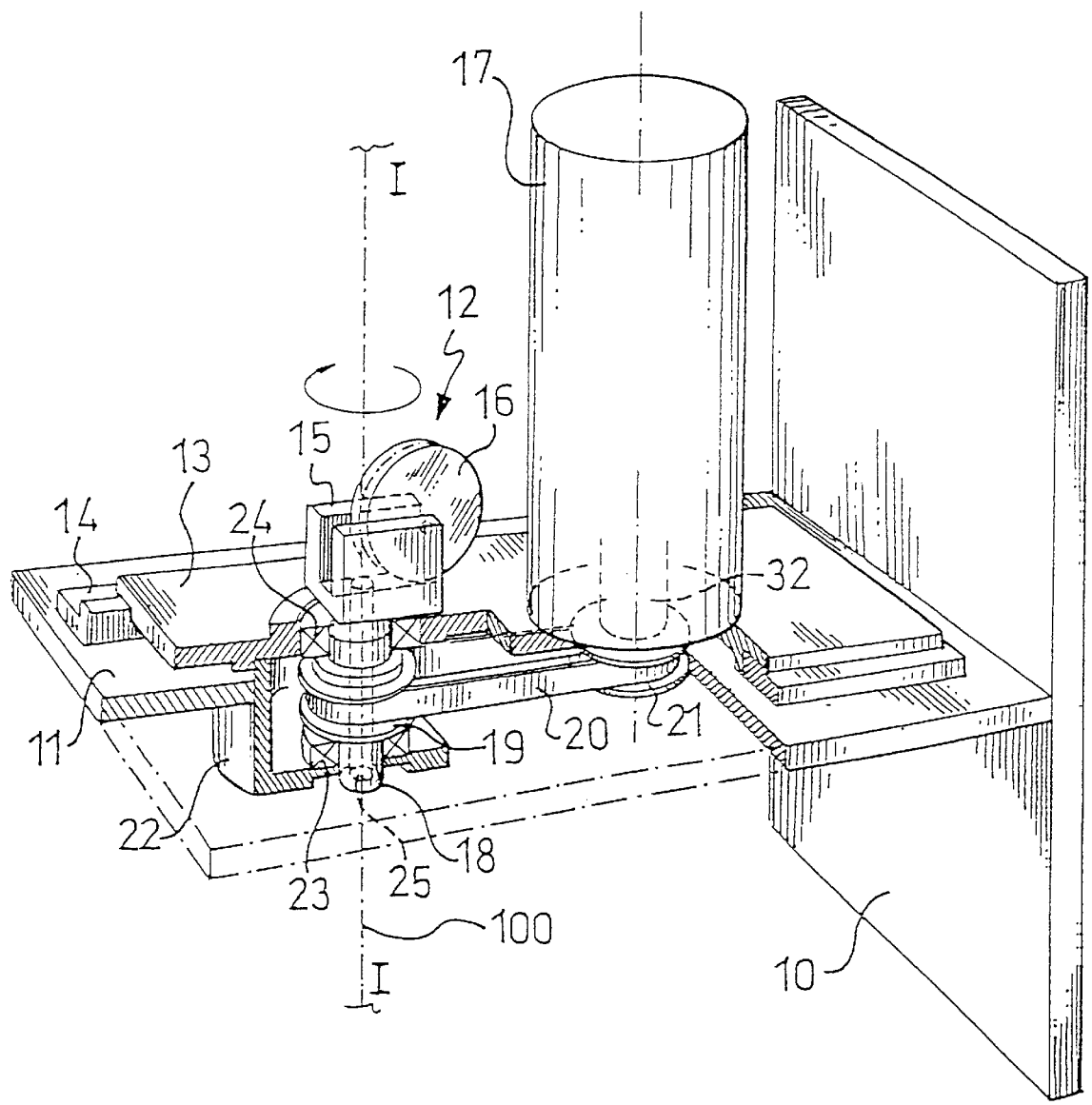
FIG. 2 is a perspective view, in partial cross-section, of a device according to the present invention for applying a torque to an optical fiber.

As shown in FIG. 2, the twisting device 8 comprises a pulley 16 rotatably driven about the drawing axis I—I of the optical fiber 100 by a driving group 12 supported by a supporting plate 11 of a framework 10 by means of an intermediate plate 13 interposed therebetween.

Advantageously, the intermediate plate 13 is slidingly mounted on a pair of slideways 14 fastened to the supporting plate 11, so that the pulley 16 and its driving group 12 may be adjustably positioned towards and away from the drawing axis I—I of the optical fiber 100.

The pulley 16 is rotatably idle-mounted in an offset 30 position on a forked-shaped member 15 of the driving group 12, so as to result substantially tangent to the drawing axis I—I of the optical fiber 100.

In order to rotatably drive the pulley 16, the driving group 12 further comprises motor means 17, kinematically connected to the fork-shaped member 15, in such a way as to transmit to the latter a rotating movement about a rotation axis coincident with the fiber drawing axis I—I.

More specifically, the fork-shaped member 15 is fastened to a pin 18 on which a driven pulley 19, kinematically connected by means of a belt 20 to a driving pulley 21 keyed on a shaft 32 of the motor means 17, is fastened.

The pin 18 and the pulley 19 are mounted in a manner known per se inside a substantially cylindrical box-shaped protection body 22 fixed to the plate 13. The rotation of the pin 18 about the rotation axis I—I is guided by a pair of roll bearings 23, 24 respectively associated to the box-shaped body 22 and to the plate 13.

The pin 18 is axially provided with a through bore 25 adapted to allow the passage of the optical fiber 100 leaving the pulley 16.

Figure 4:
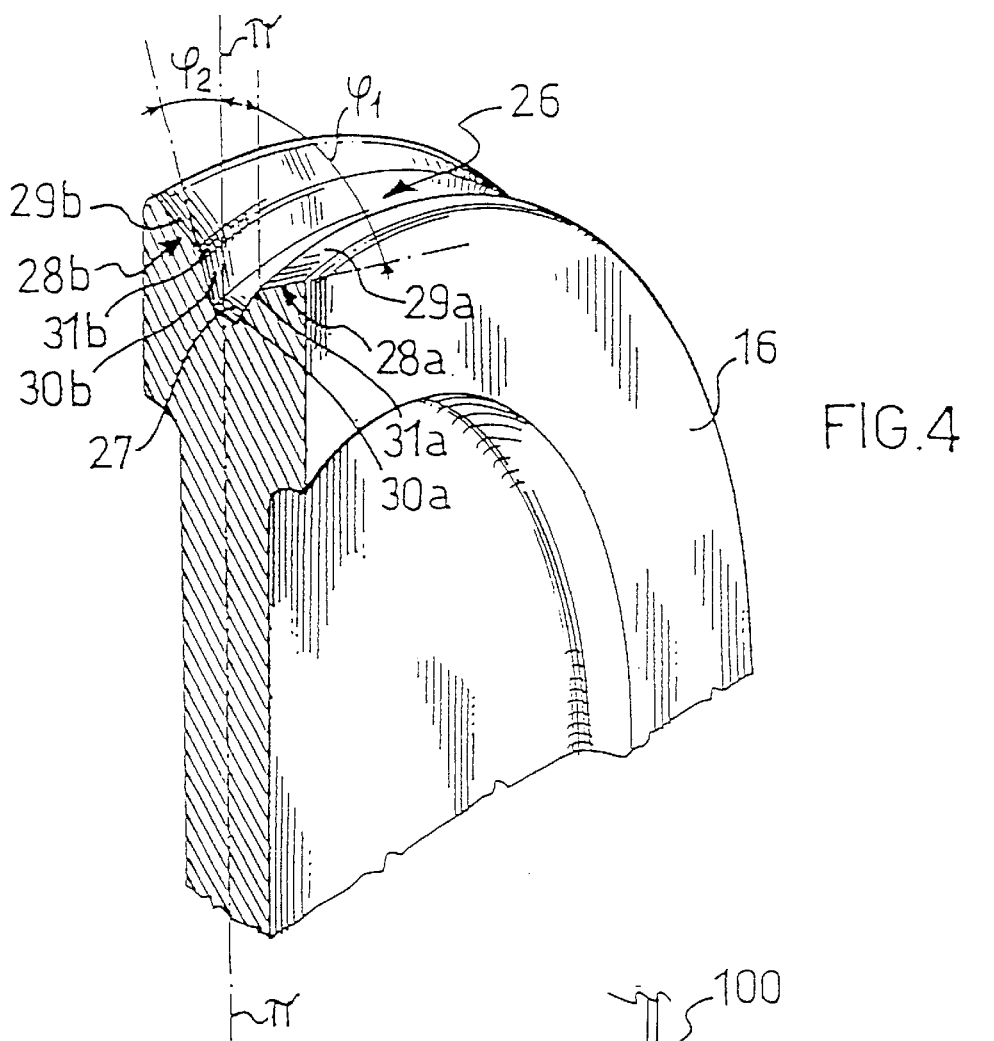
FIG. 4 is a perspective view, in an enlarged scale, of a portion of the pulley of FIG. 3, shown in partial cross-section.
Figure 3:
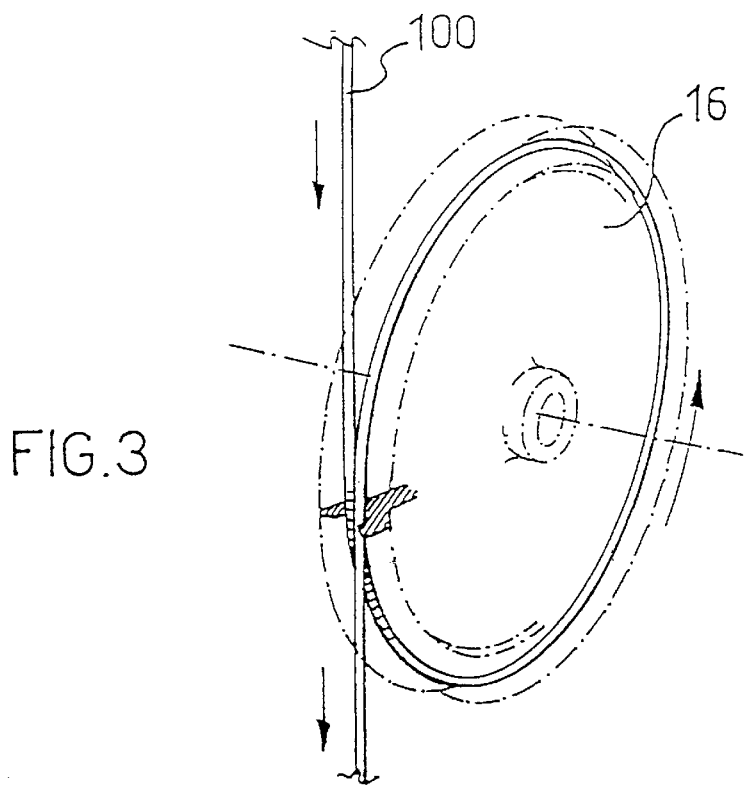
FIG. 3 is a perspective view, in an enlarged scale and in partial cross-section, of a pulley mounted on the device of FIG. 2 and shown in an operative condition thereof.

FIGS. 3 and 4 show, in greater detail, the structural features of the pulley 16. This pulley is provided with a substantially V-shaped groove 26 adapted to receive during its operation the optical fiber 100 to be twisted.

The groove 26 comprises a substantially planar bottom surface 27 (or anyway having a radius of curvature considerably greater than the radius of the fiber 100, which typically is equal to about 125 µm), connecting opposite side walls 28a, 28b. The bottom surface 27 has a width adapted to receive at one and the same time two portions of the fiber 100 lying side-by-side (associated to the portion of fiber 100 entering the pulley 16 and leaving the pulley 16, respectively).

According a preferred embodiment and in order to facilitate the introduction of the optical fiber 100 into the groove 26, each side wall 28a, 28b is provided with a first radially outer portion 29a and 29b, forming with the plane of symmetry π of the pulley 16 an angle $\phi_1$ in the range between 65° and 75°, and a second radially inner portion 30a, 30b forming with the above mentioned plane of symmetry π an angle $\phi_2$ in the range between 25° and 35°. Preferably, the angle $\phi_1$ is about 70°, whereas the angle $\phi_2$ is about 30°.

The portions 29a, 29b are connected to the portions 30a, 30b by means of an intermediate portion 31a, 31b having a radius of curvature in the range from 0 to 2 mm.

Advantageously, the pulley 16 is made of a suitable material adapted to generate with the optical fiber 100 a coefficient of friction greater than about 0.4, so as to assure a substantial absence of sliding during the winding up of the fiber 100 onto the pulley 16. Preferably, such material is a metallic material, such as for instance steel or aluminum, having a coefficient of friction of about 0.6.

To reduce the moment of inertia and the loss of balance of the pulley while rotating about the axis of the fiber, it is particularly advantageous to use a sufficiently light material for the construction of such pulley, such as for example aluminum. On the other end, particularly if the use of a heavier material is desired, such as for example steel, it may be advantageous to use a suitable counterweight for the structure that bears the pulley, with the objective to minimize the loss of balance of the pulley during its rotation. Typically, such counterweight is symmetrically arranged with respect to the pulley referring to the fiber drawing axis, in order to counterbalance the rotating pulley mass. Advantageously, such counterweight could be integral with the supporting member (15) on which the pulley is pivoted. In particular, the supporting member may be provided with such a shape and size as to obtain a proper mass distribution in order to balance the rotating pulley mass, making the center of mass of the structure: pulley-supporting member, coincident with the point where the optical fiber is tangent to the groove of the pulley.

The above described pulley preferably has a diameter in the range from about 30 mm to about 100 mm, a diameter equal to about 60 mm being particularly preferred.

With reference to apparatus 1 described hereinabove, a method for manufacturing an optical fiber according to this invention will now be disclosed.

In order to simplify the description hereinbelow, reference will be made to the operating steps of the method while already in steady conditions, thus disregarding the startup steps of the manufacturing process.

In a first step of the method, the portion 3a of the silica-based preform 3 is heated in the furnace 2, so as to melt the silica-based material and forming an optical fiber 100 having a diameter of about 125 µm.

Thereafter, the optical fiber 100 formed from the heated end portion 3a of the preform 3 is drawn by the drawing means 4 at a predetermined speed, preferably in the range of about 15 m/s.

In a following step, the optical fiber 100 is first cooled in the cooling device 5 and then coated with a suitable protective film, consisting by way of example of acrylic resin having a thickness of about 62.5 µm upon passing through the coating stations 6, 6' and the UV-ray furnaces 7 and 7' for crosslinking the applied resin.

According to the invention, a torque varying according to a predetermined law of variation is subsequently applied to the so coated optical fiber 100 by means of the pulley 16 of the twisting device 8.

In a preferred embodiment, the pulley 16 is rotated about the fiber drawing axis I—I by the motor means 17. The rotation speed of the pulley 16 may be constant or varying, and according to a unidirectional or alternate movement in clockwise and counterclockwise direction, respectively; in an alternative embodiment, the rotation speed of the pulley 16 may vary in a random way.

In such step, the optical fiber 100 is wound up on the pulley 16 while being continuously kept in contact with the bottom surface 27 of the pulley 16 for an angle substantially equal to about 360°, in such a way that the fiber is wound up on the pulley for about a complete turn. If desired, it is possible to wind the fiber up about the pulley for a number of turns greater than one, that is for an angle greater than 360°, for instance for an angle equal to about 720° corresponding to a winding of about two turns of fiber about the pulley. A winding of the optical fiber about the pulley for a number of turns greater than one, by increasing the contact surface between the optical fiber and bottom surface of the pulley, allows to use a pulley consisting of material with a relatively low coefficient of friction, in particular smaller than about 0.4.

In any case, it would be preferable to wind up the fiber around the pulley for an angle not exceeding 720°, so that the fiber is not subjected to an undesirably high drawing tension.

The fiber 100 is further partially in contact with one of the two side walls 28a, 28b and, on the other side, with a small portion of new optical fiber 100 entering the pulley 16 and moving in the same direction and with a speed equal to that possessed by the fiber leaving the pulley. Therefore a torque is applied to the optical fiber 100, which is capable to compensate the imperfections and irregularities which are inherently present in the fiber itself or which are generated during the subsequent manufacture of a cable which contains such fiber and/or during its wiring, thus considerably reducing the PMD phenomenon.

In a final step of the method, the twisted optical fiber 100 leaving the pulley 16 crosses the through bore 25 of the pin 18, which coaxially extends along the fiber drawing axis I—I and reaches the drawing means 4 from which the fiber is delivered to the collecting spool 9.

The various advantages of the present invention with respect to the prior art are immediately evident from the description reported hereinabove.

Firstly, the method of the present invention allows to notably increase the drawing speed of the optical fiber without incurring in the risk of having relative sliding between the pulley 16 and the fiber 100, thus increasing the amount of optical fiber produced per unit of time.

Thanks to the reduced inertia of the pulley 16 and of the moving parts of the driving group 12, moreover, it is possible not only to effectively apply the desired law of torque variation to the optical fiber 100, minimizing at the same time the risk of losing the twist effect, but also to use motors 17 of reduced power and cost with respect to those used in the prior art.

Advantageously, the method of the invention also allows to apply the desired number of twists to the optical fiber 100 in substantial absence of oscillations of the fiber about its own drawing axis I—I; this allows a greater uniformity both of the fiber diameter and of the thickness of the coating layer applied thereon.

Lastly, the structural features of the pulley 16 allow both to facilitate the winding and unwinding steps of the optical fiber 100, and to adopt drawing forces which are smaller than those used in the devices of the prior art with a proper choice of the material which constitutes the pulley itself.

What is claimed is:

1. A method for manufacturing an optical fiber from a preform, comprising the steps of:
    a) heating at least one end portion of said preform;
    b) drawing an optical fiber from a free end of a heated end portion along a fiber drawing axis;
    c) coating said optical fiber with a suitable coating material;
    d) applying to said coated optical fiber a torque about said fiber drawing axis,
    e) winding said coated optical fiber onto a collecting spool, characterized in that step d) is carried out by means of a rotating pulley supported upstream of said collecting spool, said pulley being positioned substantially tangentially to and pivoting about said fiber drawing axis, said optical fiber being wound up onto said pulley for an angle of at least about 360°.

2. The method according to claim 1, wherein said pulley is rotated about said fiber drawing axis at a constant rotation speed.

3. The method according to claim 1, wherein said pulley is rotated about said fiber drawing axis at a varying rotation speed.

4. The method according to claim 3, wherein said pulley is rotated about said fiber drawing axis alternately in clockwise and counterclockwise direction.

* * * * *